(12) United States Patent
Zeng (10) Patent No.: US 10,481,471 B2
(45) Date of Patent: Nov. 19, 2019

(54) SOFT BOX

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD, Shenzhen (CN)

( * ) Notice: Subject to any disclaimer, the term of this patent is extended or adjusted under 35 U.S.C. 154(b) by 258 days.

(21) Appl. No.: 15/822,087

(22) Filed: Nov. 24, 2017

(65) Prior Publication Data

US 2018/0074388 A1 Mar. 15, 2018

Related U.S. Application Data

(63) Continuation-in-part of application No. 14/773,447, filed on Sep. 8, 2015, now abandoned.

(51) Int. Cl.
| | |
|---|---|
| *F21V 17/02* | (2006.01) |
| *G03B 15/07* | (2006.01) |
| *G03B 17/56* | (2006.01) |
| *G03B 15/04* | (2006.01) |
| *F21V 7/18* | (2006.01) |

(52) U.S. Cl.
CPC ............ *G03B 15/07* (2013.01); *F21V 17/02* (2013.01); *G03B 15/0484* (2013.01); *G03B 17/566* (2013.01); *G03B 17/568* (2013.01); *F21V 7/18* (2013.01); *G03B 2215/0592* (2013.01)

(58) Field of Classification Search
CPC ...... F21V 19/00; F21V 15/013; F21V 17/002; F21V 19/003; F21V 17/104; F21V 17/16; F21V 17/00; F21V 17/006; F21V 17/004; F21V 21/025; F21V 17/10
USPC ............................................................ 362/3
See application file for complete search history.

(56) References Cited

U.S. PATENT DOCUMENTS

| | | | | |
|---|---|---|---|---|
| 4,916,471 | A * | 4/1990 | Tussey | F16M 11/08 396/180 |
| 2016/0161832 | A1* | 6/2016 | Zeng | G03B 15/07 362/3 |

\* cited by examiner

*Primary Examiner* — Anh T Mai
*Assistant Examiner* — Fatima N Farokhrooz (57) ABSTRACT

A soft box includes a housing and a main body detachably connected to the housing by a connecting device. The connecting device includes a first locking portion and a second locking portion. An installing base is connected to the bottom of the housing and the main body is embedded in the installing base, thereby the housing can rotate around the main body. The first locking portion passes through the installing base and the main body to tightly fix with the second locking portion. The housing includes a snap-fitting member and a light passageway which is a cylindrical hole and a flash lamp cap fixing device formed therein. The flash lamp cap fixing device includes a supporting platform and a pressing plate opposite to the supporting platform and having an adjustable position relative to the supporting platform. The present disclosure can quickly disassembly and be easy to carry.

16 Claims, 6 Drawing Sheets

SOFT BOX

1. CROSS-REFERENCE TO RELATED APPLICATION

The present application is a continuation-in-part of U.S. patent application Ser. No. 14/773,447, filed on Sep. 8, 2015, which is incorporated by reference in its entirety.

BACKGROUND

1. Technical Field

The present disclosure generally relates to photographic equipments field, and especially relates to a soft box.

2. Description of Related Art

In our daily life, mobile phones or cameras are often used to photograph subjects. Because of the reflection or other reasons, the quality of the picture which is taken is not very good, the shadow of the subject, even the shadow of the photographer itself, is appeared in the picture, thereby affecting the overall visual effect of the picture. Even if the professional photographers photograph in an empty space, the best picture with high quality and clear color tones can't be obtained under the influence of the shadow.

In order to obtain bright and clear pictures, a flash lamp is usually used in a photograph device to provide an auxiliary light source. A conventional flash lamp is provided by two installation forms that either at the inner or the outer part of the camera. In this way, such flash lamp located at the outer part of the camera is divided into two usage modes: one usage mode is to shine the light from the flash lamp directly on the subject, the other usage mode is to combine the flash lamp with a soft box to diffuse the light. During usage of the soft box, the light from the flash lamp is separated according to the shape of the soft box so that the texture and color of the subject being photographed can be same as that in natural light. Thus, the soft box is widely favored by the majority of users.

However, the conventional soft box generally is a soft box that can be quickly opened, which includes a housing, a housing frame and a circular fastening ring. The fastening ring is fastened to one end of the housing frame, and the housing is tightly connected to the housing frame. The soft box further includes a main rod, a connecting rod, a moving sleeve and a supporting frame. The connecting rod is connected to the fastening ring and the main rod is connected to the connecting rod. The moving sleeve is sleeved on the main rod to move along the main rod, a spring block is formed on the main rod to limit the movable position of the moving sleeve relative to the main rod. One end of the supporting frame is rotationally fixed with the moving sleeve, and the other end of the supporting frame is rotationally fixed with the housing frame.

Such housing frame is tightly fixed together with a lamp holder of the soft box, thereby it is unable to disassembly, but only can be used as a whole. Furthermore, Such structure also unable to freely combine with an ordinary single lamp holder with power cord, and also unable to provide a same lamp holder to fit with a multiple-different-size soft box. Thus this kind of soft box can't be widely used.

SUMMARY

The disclosure relates to a soft box which is convenient to assembly or disassembly and easy to carry.

The object of the present disclosure is to achieve by the following technical proposal:

In one aspect, a soft box according to an exemplary embodiment of the present disclosure includes a housing and a main body for a lamp holder detachably connected to the housing by a connecting device. The connecting device includes a first locking portion and a second locking portion. An installing base is connected to the bottom of the housing and the main body for the lamp holder is embedded in the installing base, thereby the housing can rotate around the main body for the lamp holder. The first locking portion passes through the installing base and the main body for the lamp holder to tightly fix with the second locking portion. The housing includes a snap-fitting member and a light passageway which is a cylindrical hole and a flash lamp cap fixing device is formed therein. The flash lamp cap fixing device includes a supporting platform and a pressing plate opposite to the supporting platform and having an adjustable position relative to the supporting platform.

Wherein the first locking portion includes a bolt and the second locking portion includes a handle which includes an inner threaded hole therein, the bolt passes through the installing base and the main body for the lamp holder to threadedly connect with the inner threaded hole.

Wherein the main body for the lamp holder includes a casing which includes a turntable formed therein, and a stopper is formed below the turntable to limit the rotation of the turntable.

Wherein the stopper includes a limiting bolt and a limiting screw which can pass through the casing to threadedly connect with the limiting bolt, and the turntable includes a fixing hole formed on the bottom thereof so that the limiting bolt can be inserted into the fixing hole.

Wherein a wear washer is formed between the installing base and each of two opposite sides of the turntable, one side of the wear washer is tightly fixed with the inner side of the installing base, the other side of the wear washer is tightly fixed with the turntable.

Wherein the turntable includes a gear teeth formed on the outer side thereof, and a rack formed on a side of the wear washer close to the gear teeth to engage with the gear teeth, while the installing base includes a vertical slot, and a tenon formed on a side of the wear washer close to the vertical slot to insert into the vertical slot.

Wherein the installing base includes a mounting hole, the main body for the lamp holder includes a connecting hole corresponding to the mounting hole, and the wear washer includes a center hole corresponding to the mounting hole and the connecting hole, the bolt passing through the center hole, the mounting hole and the connecting hole in turn to threadedly engage with the threaded hole.

Wherein the soft box further includes an adjusting bolt threadedly connecting with the pressing plate to limit the movable position of the press plate relative to the supporting platform by means of adjusting the adjusting bolt, and the light passageway has a shape of square corresponding to that of a flash lamp cap.

Wherein the snap-fitting member includes an annular column hole connected to the front end of the light passageway, a plurality of mounting grooves formed on the peripheral of the annular column hole and an annular disc formed on the radial peripheral of the annular column hole, each mounting groove being L-shaped configuration and including an axial groove and a radial groove, the axis of the annular column hole coincided with the central line of the light passageway, and an axial locating end face formed between the pressing plate and the annular column hole.

Wherein the installing base is detachably connected to the housing via threaded connection.

Wherein the installing base is integrated with the housing and extended downward from the bottom of the housing.

Wherein a plain washer is formed between the handle and the outer side of the installing base.

Wherein the stopper includes a limiting screw, and the fixing hole includes an inner thread therein for threadedly connecting with the limiting screw to limit the rotation of the turntable.

Wherein the wear washer includes a first wear washer and a second wear washer, the first wear washer is formed on the side of the main body for the lamp holder close to the bolt, and the second wear washer is formed on the side of the main body for the lamp holder close to the handle.

In another aspect, a soft box according to an exemplary embodiment of the present disclosure includes a housing and a main body for a lamp holder detachably connected to the housing by a connecting device. The housing includes a discoid main portion and an installing base positioned on the bottom of the main portion. The main body for the lamp holder includes a casing embedded in the installing base, a turntable formed in the casing and a stopper formed below the turntable and configured for limiting the rotation of the turntable so that the housing can rotate around the main body for the lamp holder. The connecting device includes a first locking portion and a second locking portion. The first locking portion passes through the installing base and the main body for the lamp holder to tightly fix with the second locking portion. The main portion includes a snap-fitting member and a light passageway which is a cylindrical hole and a flash lamp cap fixing device is formed therein. The flash lamp cap fixing device includes a supporting platform and a pressing plate opposite to the supporting platform and having an adjustable position relative to the supporting platform.

Wherein the first locking portion includes a bolt, the second locking portion includes a handle which includes an inner threaded hole therein, the bolt passes through the installing base and the main body for the lamp holder to threadedly connect with the inner threaded hole; while the stopper includes a limiting bolt and a limiting screw which can pass through the casing to threadedly connect with the limiting bolt, and the turntable includes a fixing hole formed on the bottom thereof so that the limiting bolt can be inserted into the fixing hole.

Wherein the installing base is integrated with the main portion and extended downward from the bottom of the main portion, a plain washer is formed between the handle and the outer side of the installing base.

Wherein a wear washer is formed between the installing base and each of two opposite sides of the turntable, one side of the wear washer tightly fixed with the inner side of the installing base and the other side of the wear washer tightly fixed with the turntable; the turntable including a gear teeth formed on the outer side thereof, and a rack formed on a side of the wear washer close to the gear teeth to engage with the gear teeth, the installing base including a vertical slot, and a tenon formed on a side of the wear washer close to the vertical slot to insert into the vertical slot; the wear washer including a first wear washer formed on the side of the main body for the lamp holder close to the bolt, and a second wear washer formed on the side of the main body for the lamp holder close to the handle.

Wherein the installing base includes a mounting hole, the main body for the lamp holder includes a connecting hole corresponding to the mounting hole, and the wear washer includes a center hole corresponding to the mounting hole and the connecting hole, the bolt passing through the center hole, the mounting hole and the connecting hole in turn to threadedly engage with the threaded hole.

Wherein the soft box further includes an adjusting bolt threadedly connecting with the pressing plate to limit the movable position of the press plate relative to the supporting platform by means of adjusting the adjusting bolt, and the light passageway has a shape of square corresponding to that of a flash lamp cap; the snap-fitting member comprising an annular column hole connected to the front end of the light passageway, a plurality of mounting grooves formed on the peripheral of the annular column hole and an annular disc formed on the radial peripheral of the annular column hole, each mounting groove being L-shaped configuration and including an axial groove and a radial groove, the axis of the annular column hole coincided with the central line of the light passageway, and an axial locating end face formed between the pressing plate and the annular column hole.

The present disclosure provides the advantages as below.

Comparing with the related art, in the exemplary embodiment of the present disclosure, the first locking portion passes through the installing base and the main body for the lamp holder to tightly fix with the second locking portion, thereby a detachable connection between the housing and the main body of the lamp holder is realized. Such kind of connection is simple so that it can be convenient to assembly or disassembly the housing and the main body for the lamp holder, freely change a lamp shade or other reflectors on a conventional main body for the lamp holder, which greatly increase the usage range and occasion, is convenient to carry and more compatible with the lamp holder of the market and with lower cost of use. At the same time, the housing can rotate around the main body for the lamp holder so that the reflective lamp of the soft box can be irradiated with a plurality of angles. In this way, different working environments can be used to further increase the usage range and occasion of the soft box. At last, the kind of soft box with a flash lamp cap fixing device which is formed in the light passageway, the flash lamp can be tightly connected to the snap-fitting member via the lamp holder. Comparing with the related art, such fixed connection solves the problem of needing to adjust the angle and position of the lamp holder so as to correspond the snap-fitting member during usage process, which is more convenient to use.

BRIEF DESCRIPTION OF THE DRAWINGS

The included drawings below are used to provide further understanding of the exemplary embodiment of the present disclosure and form a part of the specification, which is used to illustrate the exemplary embodiment of the present disclosure and to explain the principle of this present disclosure together with the description of the text. Obviously, the drawings described below are just some embodiments of the present disclosure, a person having ordinary skill in the art, under without a creative labor, can also obtain other appended drawings according to the drawings described below. The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure is illustrated by way of example and not by way of limitation in the figures of the accompanying drawings, in which like reference numerals indicate similar elements.

Referring to FIGS. 1-6, a soft box in accordance with an exemplary embodiment of the present disclosure includes a housing 1 for the soft box and a main body for a lamp holder 2 detachably connected to the housing by a connecting device 3. The connecting device 3 includes a first locking portion 31 and a second locking portion 32. The housing 1 includes a discoid main portion 10 and an installing base 11 positioned on the bottom of the main portion 10 and the main body for the lamp holder 2 is embedded in the installing base 11, thereby the housing 1 can rotate around the main body for the lamp holder 2. The first locking portion 31 passes through the installing base 11 and the main body for the lamp holder 2 to tightly fix with the second locking portion 32. The main portion 10 includes a snap-fitting member (not labeled) and a light passageway 14 which is a cylindrical hole and a flash lamp cap fixing device (not labeled) is formed therein. The flash lamp cap fixing device includes a supporting platform 17 and a pressing plate 16 opposite to the supporting platform 17 and having an adjustable position relative to the supporting platform 17.

In the exemplary embodiment of the present disclosure, the first locking portion 31 passes through the installing base 11 and the main body for the lamp holder 2 to tightly fix with the second locking portion 32, thereby a detachable connection between the housing 1 and the main body for the lamp holder 2 is realized. Such kind of connection structure is simple so that it can be convenient to assembly or disassembly the housing 1 and the main body for the lamp holder 2, freely change a lamp shade or other reflectors on the conventional main body for the lamp holder 2, which greatly increase the usage range and occasion, is convenient to carry and more compatible with the lamp holder of the market and with lower cost of use. At the same time, the housing 1 can rotate around the main body for the lamp holder 2 so that the reflective lamp of the soft box can be irradiated with a plurality of angles. In this way, different working environments can be used to further increase the usage range and occasion of the soft box. At last, this kind of soft box with a flash lamp cap fixing device which is formed in the light passageway 14, the flash lamp is tightly connected to the snap-fitting member via the lamp holder. Comparing with the related art, such fixed connection solves the problem of needing to adjust the angle and position of the lamp holder so as to correspond the snap-fitting member during usage process, which is more convenient to use.

Furthermore, the installing base 11 is fixed with the housing 1 by an installing member 6. In the exemplary embodiment of the present disclosure, the installing member 6 is formed threaded connection between the installing base 11 and the housing 1, which is simple and easy to assembly. Of course, the installing base 11 can be installed with the housing 1 via other ways, which is not repeated here.

Moreover, the first locking portion 31 is engaged with the second locking portion 32 by a plurality of connection modes. The first locking portion 31 includes a bolt 310, and the second locking portion 32 includes a handle 320 which includes an inner threaded hole 321 therein. The bolt 310 passes through the installing base 11 and the main body for the lamp holder 2 to threadedly connect with the inner threaded hole 321. In the exemplary embodiment of the present disclosure, the first locking portion 31 is a bolt, and the second locking portion 32 is a handle which includes the inner threaded hole 321 therein so that the bolt 310 can be threadedly engaged with the inner threaded hole 321, which is easy to assembly, of simple structure, and of high reliable connection.

Of course, the first locking portion 31 can be engaged with the second locking portion 32 by a fixed connection mode. For example, the first locking portion 31 is a lock catch, and the second locking portion 32 is a handle which includes a through-hole in the center thereof. The lock catch passes through the through-hole to snap onto the outer side of the handle. That is to say, the first locking portion 31 and the second locking portion 32 can be engaged with each other by a plurality of connection ways. The exemplary embodiment mentioned above which is adopted in the present disclosure is only to better explain the technical proposal of the present disclosure. Therefore, any technical proposal can't be considered different from the technical proposal of the present disclosure if only simply changing the connection mode between the first locking portion 31 and the second locking portion 32.

As a further improvement of the present embodiment, the main body for the lamp holder 2 includes a casing 21 which includes a turntable 22 formed therein, and a stopper 23 is formed on the bottom of the turntable 22 to limit the rotation of the turntable 22. When the housing 1 is needed to rotate around the main body for the lamp holder 2, first loosing the stopper 23 to turn the turntable 22, and then the housing 1 can rotate together with the turntable 22 because the housing 1 is fixed with the turntable 22. When the housing 1 is rotated to a position of a desired angle, at this time, the stopper 23 will be fixed with the housing 1 to stabilize the housing 1 on its needed rotation position. In this way, the housing 1 can smoothly adjust its rotation angle to satisfy the multi-angle adjustment requirements in different situations.

Specifically, the stopper 23 includes a limiting bolt 231 and a limiting screw 232 passing through the casing 21 to threadedly connect with the limiting bolt 231. The turntable 22 includes a fixing hole 221 formed on the bottom thereof so that the limiting bolt 231 can be inserted into the fixing hole 221. When the housing 1 is needed to rotate around the main body for the lamp holder 2, first loosing the limiting screw 232 and removing the limiting bolt 231 from the fixing hole 221 to turn the turntable 22, and then the housing 1 can rotate together with the turntable 22 because the housing 1 is fixed with the turntable 22. When the housing 1 is rotated to a position of a desired angle, at this time, the limiting bolt 231 is inserted into the fixing hole 221, the limiting screw 232 passes through the casing 21 and threadedly connects with the limiting bolt 231, thereby the turntable 22 is fixed with the housing 1. Thus, the limiting structure which the stopper 23 includes the limiting bolt 231 and the limiting screw 232 is simple, easy to assembly and of high limit reliability.

It can be understood, the stopper 23 just only includes the limiting screw 232 to limit the rotation position of the turntable 22, at this time, an inner thread is provided in the fixing hole 221 to threadedly connect with the limiting screw 232 in order to limit the rotation of the turntable 22, which is more simple structure. That is to say, the limit structure of the present disclosure can be flexibly changed according to actual production demands.

Figure 1:
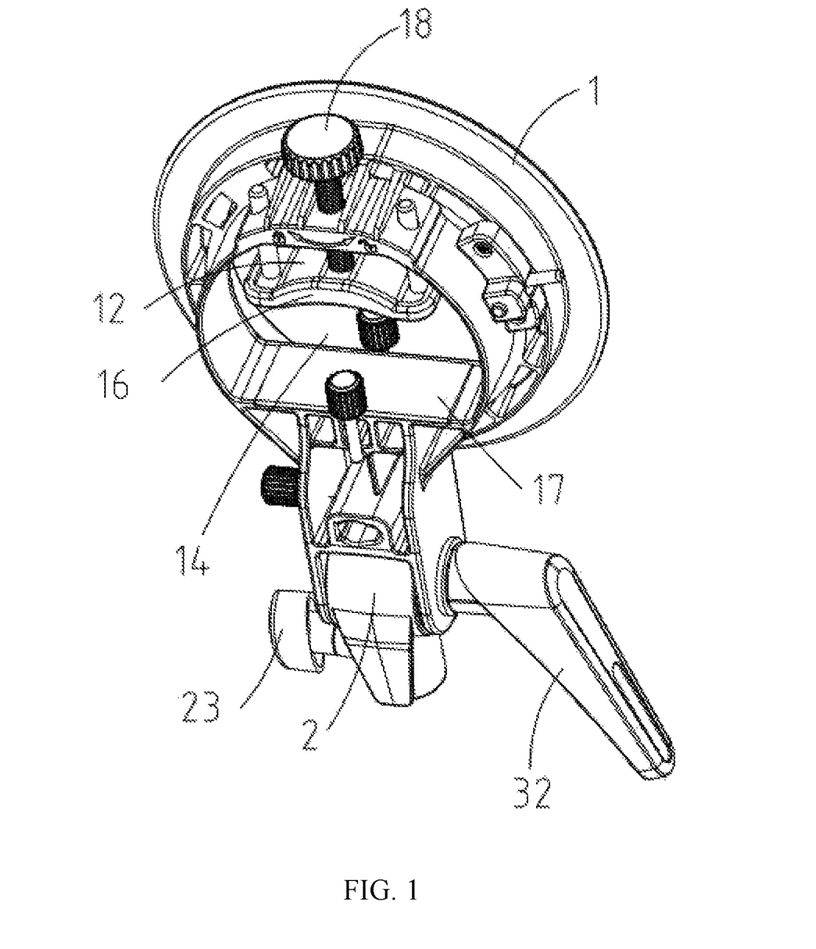
FIG. 1 is a schematic view of the soft box in accordance with an exemplary embodiment.
Figure 2:
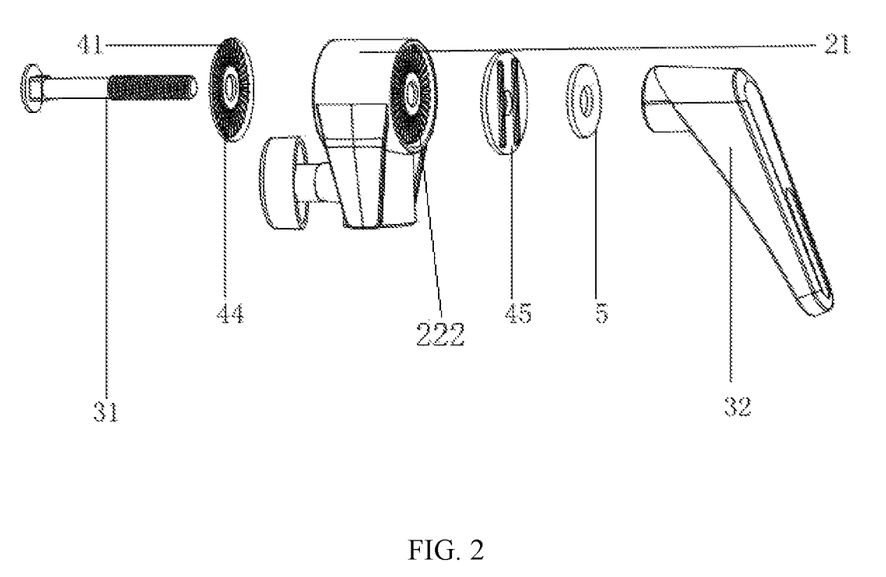
FIG. 2 is similar to FIG. 1, but shown a connection way of a wear washer of the soft box of FIG. 1.
Figure 3:
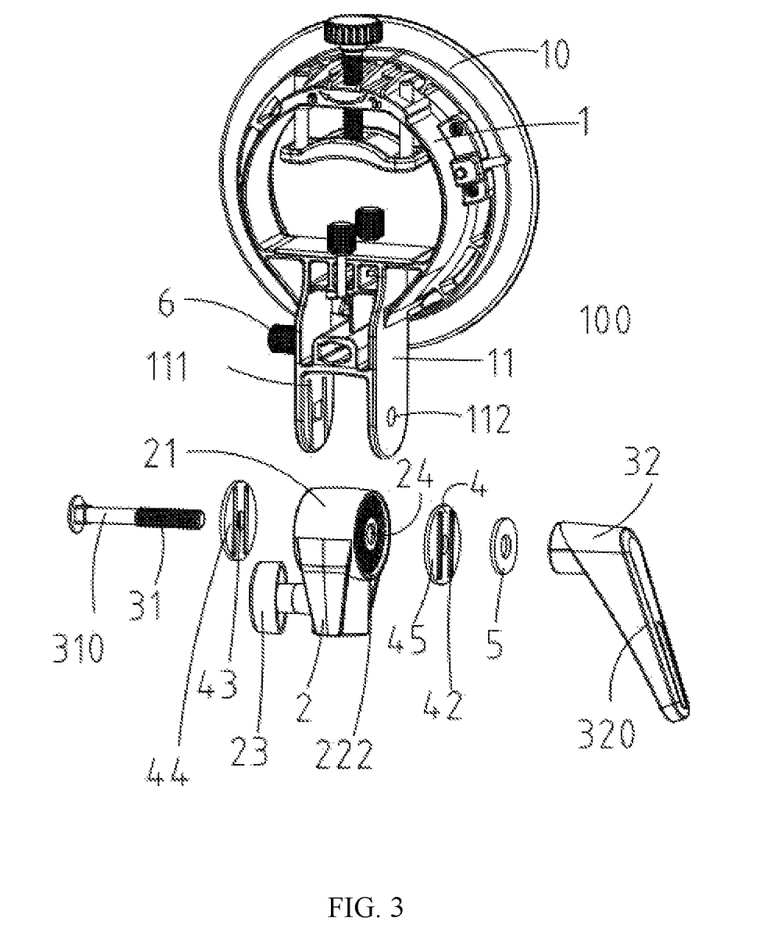
FIG. 3 is similar to FIG. 2, but shown another connection way of a wear washer of the soft box of FIG. 1.
Figure 4:
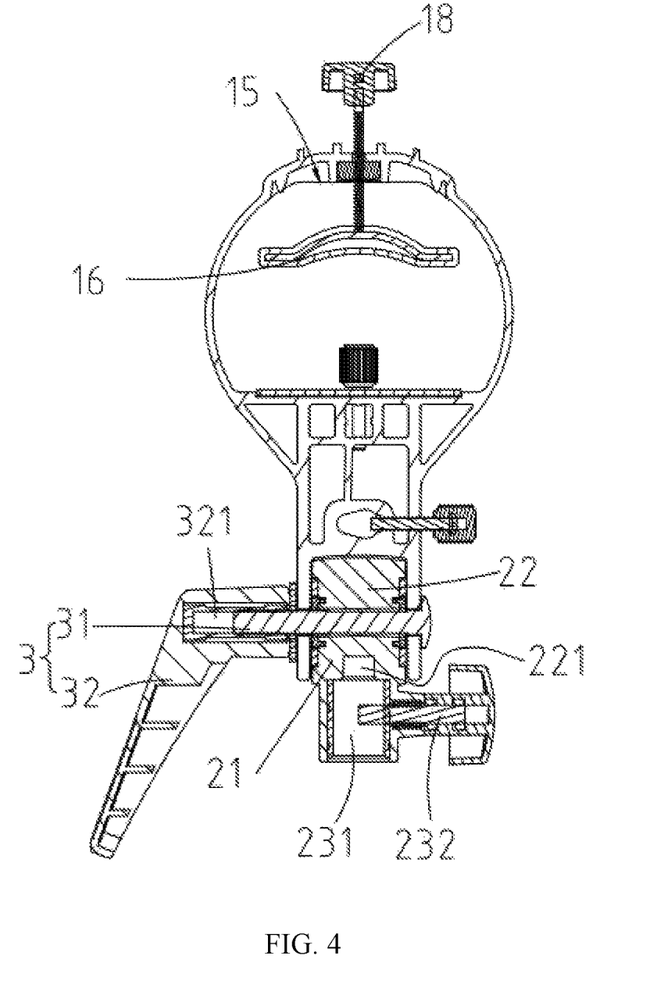
FIG. 4 is a cross sectional view of the soft box of FIG. 1.

As another further improvement of the present embodiment, a wear washer 4 is formed between the installing base 11 and each of two opposite sides of the turntable 22. One side of the wear washer 4 is tightly fixed with the inner side of the installing base 11, and the other side of the wear washer 4 is tightly fixed with the turntable 22. The wear washer 4 is connected between two sides of the turntable 22 and the installing base 11, thereby the turntable 22 is tightly fixed with the installing base 11. At the same time, when the turntable 22 is rotated relative to the installing base 11, the relative friction of connection joint between the turntable 22 and the installing base 11 is mainly sustained by the wear washer 4, which can better protect the housing 1 and the main body for the lamp holder 2. Even when the joint between the turntable 22 and the installing base 11 is damaged, it just only needs change the wear washer 4, thereby maintenance cost can be saved.

Furthermore, the turntable 22 includes a gear teeth 222 formed on the outer side thereof, and a rack 41 is formed on a side of the wear washer 4 close to the gear teeth 222. The installing base 11 includes a vertical slot 111, and a tenon 42 is formed on a side of the wear washer 4 close to the vertical slot 111. The rack 41 is engaged with the gear teeth 222 and the tenon 42 is inserted into the vertical slot 111. The wear washer 4 can be more closely engaged with the installing base 11 via meshing the rack 41 with the gear teeth 222, which can reduce slip during in the turning process. The wear washer 4 can be tightly fixed with the installing base 11 by inserting the tenon 42 into the vertical slot 111, which is simple and not easy to slip.

Specifically, the connection way of two sides of the wear washer 4 can be flexibly changed. For example, one side of the wear washer 4 meshes with the turntable 22, and the other side also uses a meshing structure to mesh with the inner side of the installing base 11. In this way, both sides of the wear washer 4 include the meshing structure, thereby the stronger connection stability of both sides of the wear washer 4 is ensured. Of course, both sides of the wear washer 4 use the fixed structure that the tenon 42 and the vertical slot 111 are cooperated with each other, which is more convenient to assemble.

More specifically, the outer edge of the tenon 42 is arc-shaped, the inner edge of the vertical slot 111 includes a corresponding cambered surface to engage with the outer edge of the tenon 42, and the top edge of the tenon 42 includes a guiding surface. In this way, when the tenon 42 inserting into the vertical slot 111, the tenon 42 is first entered the vertical slot 111 from the guiding surface because it can be more easily inserted. Secondly, the tenon 42 slides on their contacting surfaces relative to the vertical slot 111 until the tenon 42 sides into the vertical slot 111. The tenon 42 is easier to slide in the vertical slot 111 because the contacting surface between the tenon 42 and the vertical slot 111 is curved, thereby the faster assembly is completed. Meanwhile, the tenon 42 is not easy to transversely get out of the vertical slot 111, thereby the fastness of the connection is ensured.

Preferably, the wear washer 4 includes a first wear washer 44 and a second wear washer 45. The first wear washer 44 is formed on the side of the main body for the lamp holder 2 close to the bolt 310, and the second wear washer 45 is formed on the side of the main body for the lamp holder 2 close to the handle 320.

Preferably, the installing base 11 includes a mounting hole 112, the main body for the lamp holder 2 includes a connecting hole 24 corresponding to the mounting hole 112, and the wear washer 4 includes a center hole 43 corresponding to the mounting hole 112 and the connecting hole 24. The bolt 310 passes through the center hole 43, the mounting hole 112 and the connecting hole 24 in turn to threadedly engage with the threaded hole 321.

Preferably, a plain washer 5 is formed between the handle 320 and the outer side of the installing base 11, thereby the outer side of the installing base 11 can't be damaged by the outer side of the handle 320.

Figure 5:
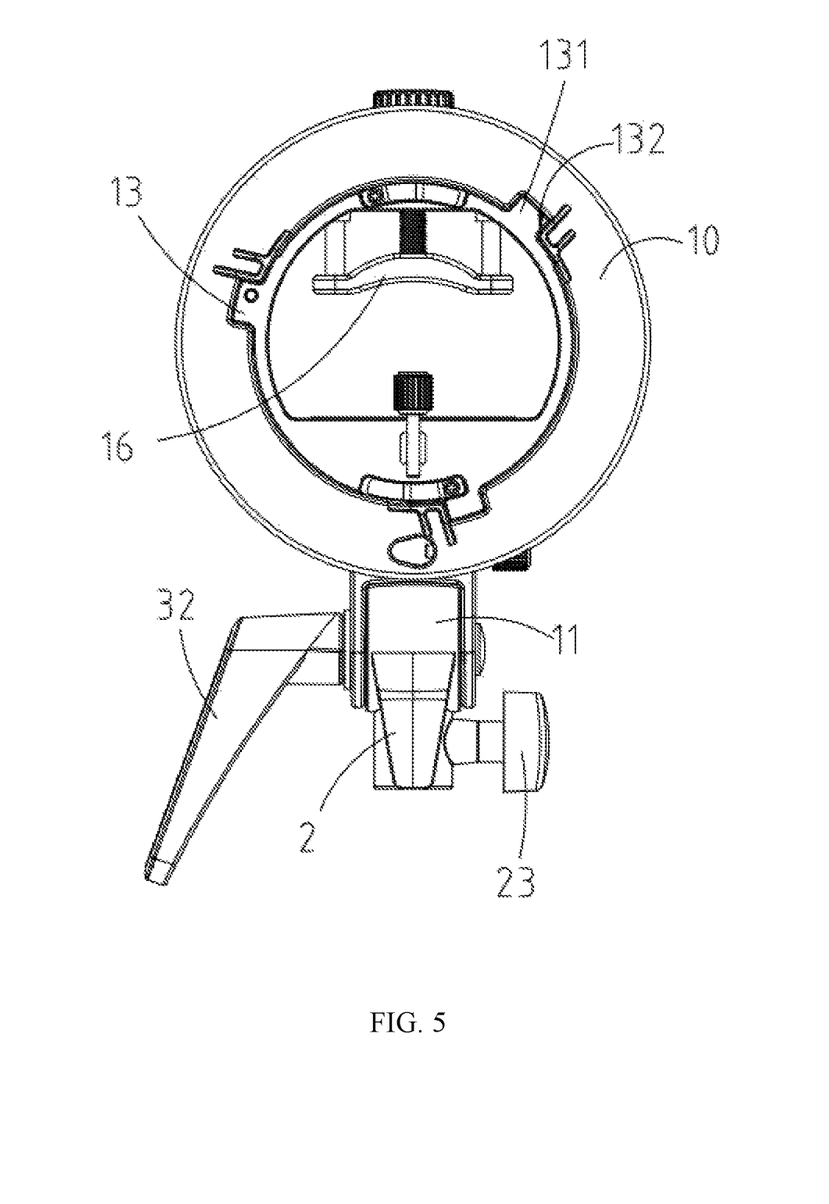
FIG. 5 is a front view of a housing of the soft box of FIG. 1.
Figure 6:
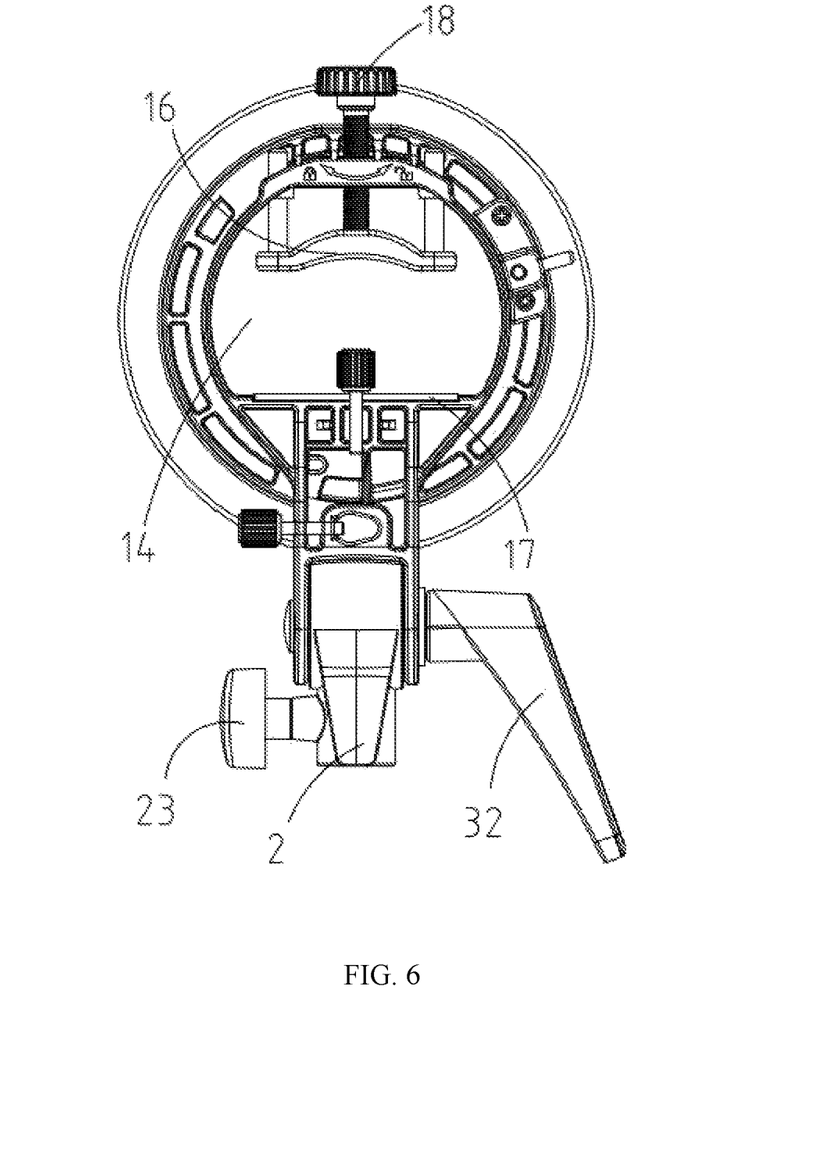
FIG. 6 is similar to FIG. 5, but shown the housing of the soft box from the back view.

As another further improvement of the present embodiment, the soft box further includes an adjusting bolt 18 threadedly connecting with the pressing plate 16 to limit the position of the press plate 16 relative to the supporting platform 17 by means of adjusting the adjusting bolt 18. The light passageway 14 has a shape of square corresponding to that of a flash lamp cap. The snap-fitting member includes an annular column hole 12 connected to the front end of the light passageway 14. A plurality of mounting grooves 13 is formed on the peripheral of the annular column hole 12 and an annular disc 120 is formed on the radial peripheral of the annular column hole 12. Each mounting groove 13 is L-shaped configuration and includes an axial groove 131 and a radial groove 132. The axis of the annular column hole 12 is coincided with the central line of the light passageway 14. An axial locating end face 15 is formed between the pressing plate 16 and the annular column hole 12.

The L-shaped structure is provided to greatly reduce the whole volume of the soft box and improve high portability. In addition, because of this L-shaped structure, the whole product can be molded by the plastic injection molding, and then it can be obtained after simple assembly, which can greatly save the manpower and cost. Furthermore, the technical proposal of the present disclosure can optionally adjust the connection position before and after between the flash lamp holder and the soft box. At the same time, it can ensure that the center of the flash lamp holder is located on the central axis of the light passageway to achieve high light transmission, which the two conventional types snap-fitting members can't be realized. In the preferred proposal of the present disclosure, the soft box integrates the chuck with the fastening ring of the related art in essence through setting the annular disc. In this way, the set-top flash lamp can be used simultaneously with a set-top flash foldable soft box and a strobe flash soft box, which can perfect implementation of the two kinds of snap-fitting members of the related art, and also save user's cost. Thus, the object of the present disclosure is obviously realized.

In another aspect, a soft box according to an exemplary embodiment of the present disclosure includes a housing 1 and a main body for a lamp holder 2 detachably connected to the housing 1 by a connecting device 3. The connecting device 3 includes a first locking portion 31 and a second locking portion 32. The housing 1 includes a discoid main portion 10 and an installing base 11 extended downward from the bottom of the main portion 10. That is to say, the main portion 10 is integrated with the installing base 11. The main body for the lamp holder 2 is embedded in the installing base 11. The first locking portion 31 includes a bolt 310 and the second locking portion 32 includes a handle 320 which includes an inner threaded hole 321 therein, the bolt 310 passes through the installing base 11 and the main body for the lamp holder 2 to threadedly connect with the inner threaded hole 321. The main body for the lamp holder 2 includes a casing 21 which includes a turntable 22 formed therein, and a stopper 23 is formed below the turntable 22. The stopper 23 includes a limiting bolt 231 and a limiting screw 232 which can pass through the casing 21 to threadedly connect with the limiting bolt 231, and the turntable 22 includes a fixing hole 221 formed on the bottom thereof so that the limiting bolt 231 can be inserted into the fixing hole 221. A wear washer 4 is formed between the installing base 11 and each of two opposite sides of the turntable 22. The turntable 22 includes a gear teeth 222 formed on the outer side thereof, and a rack 41 formed on a side of the wear washer 4 close to the gear teeth 222 to engage with the gear teeth 222, while the installing base 11 includes a vertical slot 111, and a tenon 42 formed on a side of the wear washer 4 close to the vertical slot 111 to insert into the vertical slot 111. The wear washer 4 includes a first wear washer 44 and a second wear washer 45. The first wear washer 44 is formed on the side of the main body for the lamp holder 2 close to the bolt 310, and the second wear washer 45 is formed on the side of the main body for the lamp holder 2 close to the handle 320. A plain washer 5 is formed between the handle 320 and the outer side of the installing base 11. The installing base 11 includes a mounting hole 112, the main body for the lamp holder 2 includes a connecting hole 24 corresponding to the mounting hole 112, and the wear washer 4 includes a center hole 43 corresponding to the mounting hole 112 and the connecting hole 24. The bolt 310 passes through the center hole 43, the mounting hole 112 and the connecting hole 24 in turn to threadedly engage with the threaded hole 321.

The assembly process of the present embodiment is provided below: when assembling the housing 1 and the main body for the lamp holder 2, the wear washer 4 is first meshed with two opposite sides of the turntable 22 to align the center hole 43 of the wear washer 4 with the connecting hole 24 of the main body for the lamp holder 2. Secondly, the tenon 42 is inserted into the vertical slot 111 along the inside direction of the vertical slot 111, and both the wear washer 4 and the main body for the lamp holder 2 are snapped into the inside of the installing base 11, at the same time, the center hole 43, the connecting hole 24 and the mounting hole 112 are aligned with each other. Finally, the bolt 310 passes through the mounting hole 112, the center hole 43, the connecting hole 24 and the plain washer 5 in turn to threadedly engage with the threaded hole 321.

When disassembling the housing 1 from the main body for the lamp holder 2, the bolt 310 is first unscrewed from the threaded hole 321, the main body for the lamp holder 2 and installing base 11 is then slid out of the vertical slot 111 along the inside direction of the vertical slot 111. Thus, the detachable installation between the housing 1 and the main body for the lamp holder 2 is completed.

When the housing 1 is needed to rotate around the main body for the lamp holder 2, first loosing the limiting screw 232 and removing the limiting bolt 231 from the fixing hole 221 to turn the turntable 22, and then the housing 1 can rotate together with the turntable 22 because the housing 1 is fixed with the turntable 22. When the housing 1 is rotated to a position of a desired angle, at this time, the limiting bolt 231 is inserted into the fixing hole 221, the limiting screw 232 passes through the casing 21 and threadedly connects with the limiting bolt 231 so that the turntable 22 is fixed.

Comparing with the related art, in the exemplary embodiment of the present disclosure, the first locking portion passes through the installing base and the main body for the lamp holder to tightly fix with the second locking portion, thereby a detachable connection between the housing and the main body of the lamp holder is realized. Such kind of connection structure is simple and convenient to assembly or disassembly the housing and the main body for the lamp holder, freely change the lamp shade or other reflectors on the conventional main body for the lamp holder, which greatly increase the usage range and occasion, is convenient to carry and more compatible with the lamp holder of the market and with lower cost of use. At the same time, the housing can rotate around the main body for the lamp holder so that the reflective lamp of the soft box can be irradiated with a plurality of angles. In this way, different working environments can be used to further increase the usage range and occasion of the soft box. At last, the kind of soft box with a flash lamp cap fixing device which is formed in the light passageway, the flash lamp is connected to the snap-fitting member via the lamp holder.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A soft box comprising:
   a housing comprising a snap-fitting member, and a light passageway which is a cylindrical hole and a flash lamp cap fixing device is formed therein;
   a main body for a lamp holder detachably connected to the housing by a connecting device; the connecting device comprising a first locking portion and a second locking portion;
   an installing base connected to the bottom of the housing and the main body for the lamp holder embedded in the installing base so that the housing can rotate around the main body for the lamp holder; and wherein the first locking portion passes through the installing base and the main body for the lamp holder to tightly fix with the second locking portion, and the flash lamp cap fixing device comprises a supporting platform and a pressing plate opposite to the supporting platform and having an adjustable position relative to the supporting platform;
   wherein the first locking portion comprises a bolt and the second locking portion comprises a handle which comprises an inner threaded hole therein, the bolt passes through the installing base and the main body for the lamp holder to threadedly connect with the inner threaded; wherein the main body for the lamp holder comprises a casing which comprises a turntable formed therein, and a stopper is formed below the turntable, to limit the rotation of the turntable and wherein the stopper comprises a limiting bolt and a limiting screw which can pass through the casing to threadedly connect with the limiting bolt, and the turntable comprises a fixing hole formed on the bottom thereof so that the limiting bolt can be inserted into the fixing hole.

2. The soft box as claimed in claim 1, wherein a wear washer is formed between the installing base and each of two opposite sides of the turntable, one side of the wear washer is tightly fixed with the inner side of the installing base, the other side of the wear washer is tightly fixed with the turntable.

3. The soft box as claimed in claim 1, wherein the soft box further comprises an adjusting bolt threadedly connecting with the pressing plate to limit the movable position of the press plate relative to the supporting platform by means of adjusting the adjusting bolt, and the light passageway has a shape of square corresponding to that of a flash lamp cap.

4. The soft box as claimed in claim 1, wherein the installing base is detachably connected to the housing via threaded connection.

5. The soft box as claimed in claim 1, wherein the installing base is integrated with the housing and extended downward from the bottom of the housing.

6. The soft box as claimed in claim 2, wherein a plain washer is formed between the handle and the outer side of the installing base.

7. The soft box as claimed in claim 1, wherein the stopper comprises a limiting screw, and the fixing hole comprises an inner thread therein for threadedly connecting with the limiting screw to limit the rotation of the turntable.

8. The soft box as claimed in claim 2, wherein the turntable comprises a gear teeth formed on the outer side thereof, and a rack formed on a side of the wear washer close to the gear teeth to engage with the gear teeth, while the installing base comprises a vertical slot, and a tenon formed on a side of the wear washer close to the vertical slot to insert into the vertical slot.

9. The soft box as claimed in claim 2, wherein the installing base comprises a mounting hole, the main body for the lamp holder comprises a connecting hole corresponding to the mounting hole, and the wear washer comprises a center hole corresponding to the mounting hole and the connecting hole, the bolt passing through the center hole, the mounting hole and the connecting hole in turn to threadedly engage with the threaded hole.

10. The soft box as claimed in claim 2, wherein the wear washer comprises a first wear washer and a second wear washer, the first wear washer is formed on the side of the main body for the lamp holder close to the bolt, and the second wear washer is formed on the side of the main body for the lamp holder close to the handle.

11. The soft box as claimed in claim 3, wherein the snap-fitting member comprises an annular column hole connected to the front end of the light passageway, a plurality of mounting grooves formed on the peripheral of the annular column hole and an annular disc formed on the radial peripheral of the annular column hole, each mounting groove being L-shaped configuration and comprising an axial groove and a radial groove, the axis of the annular column hole coincided with the central line of the light passageway, and an axial locating end face formed between the pressing plate and the annular column hole.

12. A soft box comprising: a housing comprising a discoid main portion and an installing base positioned on the bottom of the main portion, the main portion comprising a snap-fitting member, and a light passageway which is a cylindrical hole and a flash lamp cap fixing device is formed therein;
   a main body for a lamp holder detachably connected to the housing by a connecting device and comprising a casing embedded in the installing base, a turntable formed in the casing, and a stopper formed between the turntable and configured for limiting the rotation of the turntable so that the housing can rotate around the main body for the lamp holder;
   the connecting device comprising a first locking portion and a second locking portion; and wherein the first locking portion passes through the installing base and the main body for the lamp holder to tightly fix with the second locking portion, and the flash lamp cap fixing device comprises a supporting platform and a pressing plate opposite to the supporting platform and having an adjustable position relative to the supporting platform and wherein the first locking portion comprises a bolt, the second locking portion comprises a handle which comprises an inner threaded hole therein, the bolt passes through the installing base and the main body for the lamp holder to threadedly connect with the inner threaded hole; wherein the stopper comprises a limiting bolt and a limiting screw which can pass through the casing to threadedly connect with the limiting bolt, and the turntable comprises a fixing hole formed on the bottom thereof so that the limiting bolt can be inserted into the fixing hole.

13. The soft box as claimed in claim 12, wherein the installing base is integrated with the main portion and extended downward from the bottom of the main portion, a plain washer is formed between the handle and the outer side of the installing base.

14. The soft box as claimed in claim 13, wherein a wear washer is formed between the installing base and each of two opposite sides of the turntable, one side of the wear washer tightly fixed with the inner side of the installing base and the other side of the wear washer tightly fixed with the turntable; the turntable comprising a gear teeth formed on the outer side thereof, and a rack formed on a side of the wear washer close to the gear teeth to engage with the gear teeth, the installing base comprising a vertical slot, and a tenon formed on a side of the wear washer close to the vertical slot to insert into the vertical slot; the wear washer comprising a first wear washer formed on the side of the main body for the lamp holder close to the bolt, and a second wear washer formed on the side of the main body for the lamp holder close to the handle.

15. The soft box as claimed in claim 14, wherein the installing base comprises a mounting hole, the main body for the lamp holder comprises a connecting hole corresponding to the mounting hole, and the wear washer comprises a center hole corresponding to the mounting hole and the connecting hole, the bolt passing through the center hole, the mounting hole and the connecting hole in turn to threadedly engage with the threaded hole.

16. The soft box as claimed in claim 15, wherein the soft box further comprises an adjusting bolt threadedly connecting with the pressing plate to limit the movable position of the press plate relative to the supporting platform by means of adjusting the adjusting bolt, and the light passageway has a shape of square corresponding to that of a flash lamp cap; the snap-fitting member comprising an annular column hole connected to the front end of the light passageway, a plurality of mounting grooves formed on the peripheral of the annular column hole and an annular disc formed on the radial peripheral of the annular column hole, each mounting groove being L-shaped configuration and comprising an axial groove and a radial groove, the axis of the annular column hole coincided with the central line of the light passageway, and an axial locating end face formed between the pressing plate and the annular column hole.

* * * * *